UNITED STATES PATENT OFFICE.

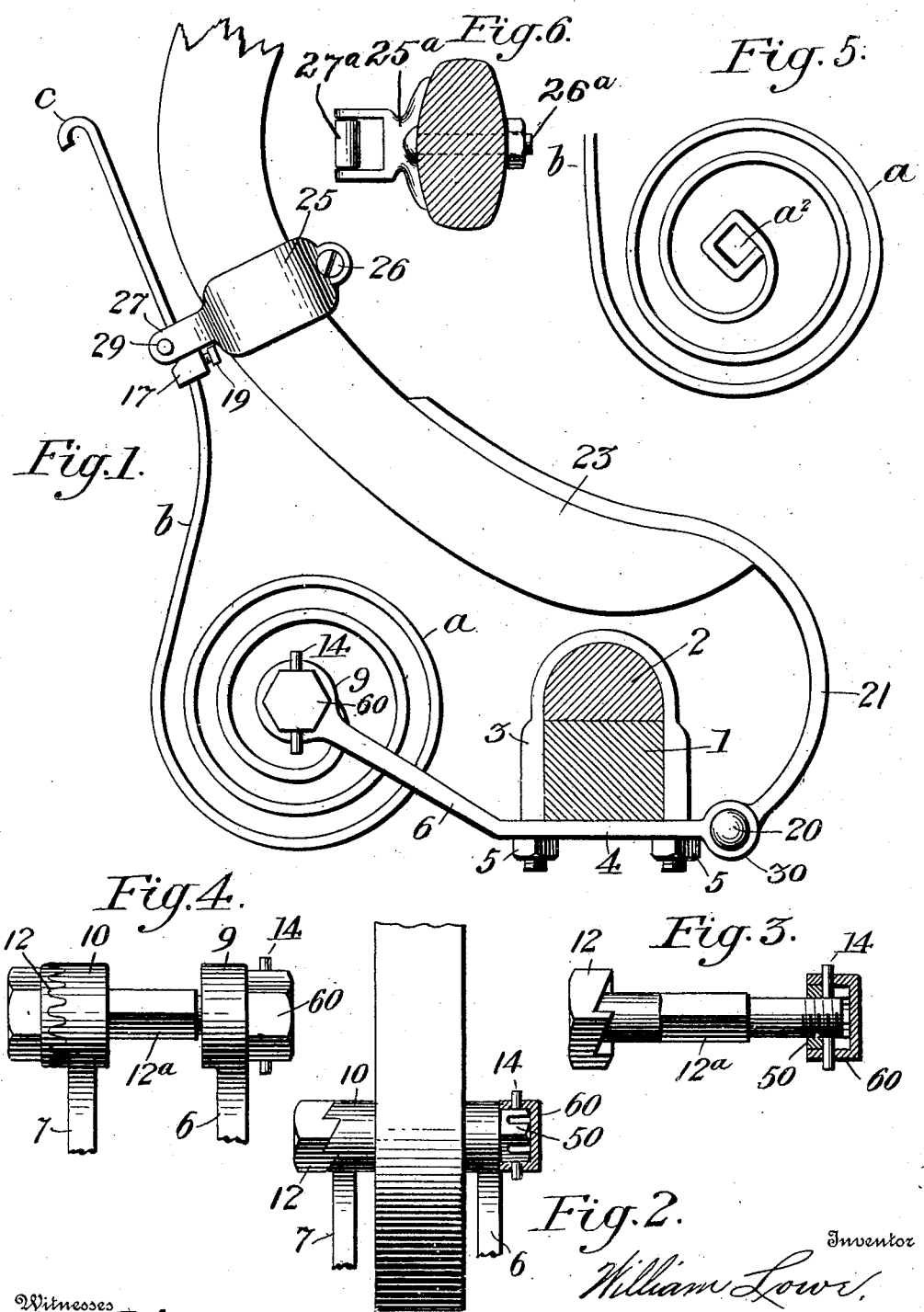

WILLIAM LOWE, OF PROVO, UTAH, ASSIGNOR TO IDEAL SHAFT SUPPORTER COMPANY, OF PROVO, UTAH.

SHAFT-SUPPORTER.

No. 865,715.   Specification of Letters Patent.   Patented Sept. 10, 1907.

Application filed October 8, 1906, Serial No. 337,921. Renewed August 14, 1907. Serial No. 388,551.

*To all whom it may concern:*

Be it known that I, WILLIAM LOWE, a citizen of the United States, residing at Provo, in the county of Utah and the State of Utah, have invented certain new and useful Improvements in Shaft-Supporters; and I do hereby declare the following to be a full, clear, and exact description of the invention, such as will enable others skilled in the art to which it appertains to make and use the same.

The invention relates to devices that are attachable to the front axle of vehicles for the purpose of holding the shafts in elevated position off the ground when the vehicles are not in use, the object being first to protect the shafts from liability of breakage when resting on the ground, and second to economize storage room when the vehicles are under cover.

The invention is illustrated in the accompanying drawing, where

Figure 1 shows an axle in cross section, a fragment of one of the shafts secured thereto, and one of my supporters holding the shaft in vertical position, Fig. 2 is a detail showing the manner of supporting and adjusting the spring, Fig. 3 shows the spring holding pin, Fig. 4 shows in elevation a modification of the means for adjusting the pin, Fig. 5 is a detail of the inner end of the spring, and Fig. 6 is a view of a modified form of clip that is secured to the shaft.

Referring to these views, 1 denotes the axle and 2 the overlying reinforcing bar.

3 indicates the ordinary clip, and 4 the base of a bracket which is secured to the under side of the axle by means of nuts 5 that screw on to the legs of the clip 3.

The spring $a$ is a flat helical spring, and is supported in rearwardly extending arms 6 and 7 projecting from the base 4 of the bracket. The rear ends of the arms 6 and 7 are provided with enlargements 9 and 10 having circular eyes for the reception of a headed pin 12, to which the inner end of the spring $a$ is rigidly attached by means of an eye $a^2$ which fits snugly over the squared portion $12^a$ of the pin which lies between the arms 6 and 7. The enlargement 10 on the end of the arm 7 has a ratchet face surrounding the opening through which the pin passes, and the inner face of the head of the pin 12 has a similar ratchet face. These ratchet faces may be formed as shown in Figs. 2 and 3 with inclined teeth, or as in Fig. 4 where the teeth are in the form of straight interlocking serrations. The opposite end of the pin is screw threaded as shown in Fig. 3 and passes through the opening in the end of the arm 6. A nut 50 having a toothed outer face is then screwed on the projecting end of the pin, and a cotter 14 is passed through a transverse opening in the pin and through the interdental spaces of the nut. As shown in Figs. 2, 3 and 4, a cap 60 is finally slipped over the nut before the cotter is passed through, and the cotter is then inserted through holes in the cap. This is an optional feature and is intended only for the purpose of concealing the nut and making a neat finish. The head of the pin is preferably squared or angular, as best shown in Figs. 2, 3 and 4, the object being to facilitate the use of a wrench in turning the pin against the tension of the spring. If desired the cap 60 may be angular also to correspond in appearance with the head at the opposite end of the pin.

As shown in Fig. 1, the free end of the spring is extended to form an arm $b$ that normally projects over and in front of the axle and passes between the arms 27 of a clip 25 which is adjustably secured to the shaft by a screw or bolt 26, a pin 29 in the outer ends of the arms serving to hold the spring arm $b$ in engagement with the shaft but permitting it to slide relatively thereto. The outer end of the spring is provided with a hook $c$ which when the shaft is lowered beyond a certain point catches against the pin 29 and prevents its further downward movement.

In order to hold the shaft in vertical position and prevent it falling rearward against the dash-board or other part of the vehicle, a stop 17 is adjustably secured to the spring arm $b$ by a set screw 19 permitting it to be fixed at any convenient point along the length of the arm to hold the shaft clear of the vehicle.

The shaft is denoted by 23 in Fig. 1, and the shaft iron 21 is shown as connected to the axle by means of a pin 20 passing through an eye in ears 30 projecting forwardly from the base plate 4 of the spring-supporting bracket. The invention is not, however, limited to this arrangement, and I may in practice employ any suitable connection between the thill iron and the axle.

It will of course be understood that one of these shaft supporters is used for each shaft. In order to apply it to the vehicle, the bracket being already in position on the axle, it is only necessary to remove the pin 12 from the arms 6 and 7, and insert the spring between the arms until the eye $a^2$ registers with the openings in the ends 9 and 10 of the arms. The pin is then thrust through and secured by means of the nut screwing on the smaller end, as already described. As will be seen in Fig. 3, the portion of the pin which has bearings in the arms is cylindrical. The eye in the arm 7 is larger than that in the arm 9, and the cylindrical parts of the pin have different diameters. The diameter of the portion near the ratchet faced head is equal to the largest diameter of the squared portion $12^a$, and the opposite end of the pin corresponds in diameter with the shortest diameter of the squared portion. This construction greatly facilitates the introduction of the pin, and the threaded end permits the enlargements 9 and 10 on the bracket arms to be clamped against the eye $a^2$ in the spring so as to prevent rattling.

The construction being as thus described, it will be understood that the tension of the spring may be regulated by rotatively adjusting the pin in its bearings in the bracket arms. The clip 25 is also adjustably secured to the shaft, so that the shaft may be held horizontal or at any desired angle above the ground, and the stop 17 on the spring being also adjustable permits the vertical position of the shaft to be nicely adjusted so as to prevent it striking the dash-board and also prevent it falling forward.

In place of the adjustable clip shown in Fig. 1, I may use the clip shown in Fig. 6 having a bolt $26^a$ that is passed through a perforation in the shaft and is secured by means of a nut on its lower end. In the arms of this clip there is the same pin as in the clip 25, but I prefer to put an anti-friction roller $27^a$ on the pin as indicated in the drawing so as to make the spring slide more easily through the clip.

Having thus described my invention, what I claim is:

1. A shaft support, comprising a bracket secured to the axle and having a pair of rearwardly extending arms provided with eyes at their outer ends, a headed pin rotatably mounted in said eyes, a helical spring having one end secured to the pin and the other end extended forwardly over the axle and slidingly connected to the shaft, one of the bracket arms having a ratchet face adjacent to its eye, and the pin head having a ratchet face coöperating with that on the bracket arm to hold the pin in different positions of rotative adjustment.

2. A shaft support, comprising a bracket secured to the axle and having a pair of rearwardly extending arms, a removable pin rotatably mounted in the arms, said pin being angular in cross section between the arms, a helical spring having an angular eye at one end removably inclosing the angular portion of the pin, and having its other end extended forward over the axle and slidingly connected to the shaft, and means for rotatably adjusting the pin to vary the tension of the spring.

3. A shaft support, comprising a bracket secured to the axle and having a pair of rearwardly extending arms provided with eyes at their outer ends, a pin having an angular head and rotatably mounted in said eyes, a helical spring having one end secured to the pin and the other end extended forward over the axle and slidingly connected to the shaft, one of the bracket arms having an outwardly facing ratchet adjacent to its eye, and the pin head having an inwardly facing coöperative ratchet, a nut screwed on the opposite end of the pin outside the other arm bracket, and means for releasably locking the nut.

In testimony whereof I affix my signature, in presence of two witnesses.

WILLIAM LOWE.

Witnesses:
B. F. GRANT,
BERT F. WILLIS.